(12) United States Patent
Caci

(10) Patent No.: US 7,050,786 B2
(45) Date of Patent: May 23, 2006

(54) METHOD AND APPARATUS FOR LOCATING A WIRELESS DEVICE

(75) Inventor: J. Claude Caci, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 228 days.

(21) Appl. No.: 10/695,894

(22) Filed: Oct. 30, 2003

(65) Prior Publication Data

US 2004/0087316 A1  May 6, 2004

Related U.S. Application Data

(60) Provisional application No. 60/422,202, filed on Oct. 30, 2002.

(51) Int. Cl.
*H04M 11/04* (2006.01)

(52) U.S. Cl. .................. 455/404.2; 455/404.1; 455/456.1; 455/456.3; 455/521

(58) Field of Classification Search ............. 455/414.2, 455/440, 456.1–456.6, 457, 521, 404.1, 404.2; 342/357.01, 357.02, 450–452, 457, 458; 701/214; 340/993, 995.19, 995.25
See application file for complete search history.

(56) References Cited

U.S. PATENT DOCUMENTS

| | | | | |
|---|---|---|---|---|
| 4,873,520 A | * | 10/1989 | Fisch et al. | 340/7.57 |
| 4,888,595 A | * | 12/1989 | Friedman | 342/457 |
| 5,432,841 A | | 7/1995 | Rimer | |
| 5,535,278 A | * | 7/1996 | Cahn et al. | 380/274 |
| 5,631,642 A | | 5/1997 | Brockelsby et al. | |
| 5,701,328 A | | 12/1997 | Schuchman et al. | |
| 5,758,288 A | | 5/1998 | Dunn et al. | |
| 5,767,788 A | | 6/1998 | Ness | |
| 5,815,814 A | | 9/1998 | Dennison et al. | |
| 5,873,040 A | | 2/1999 | Dunn et al. | |
| 5,917,449 A | * | 6/1999 | Sanderford et al. | 342/457 |

(Continued)

OTHER PUBLICATIONS

Ian Lacy et al., "Will Location-based Services Be the Next Golden Child?", Location, Location, Location, Kellogg Tech Venture 2001—Location Based Services, Apr. 15, 2001.

(Continued)

*Primary Examiner*—William Trost
*Assistant Examiner*—James D Ewart
(74) *Attorney, Agent, or Firm*—Miles & Stockbridge PC; James T. Carmichael

(57) ABSTRACT

Disclosed is a method and apparatus for locating a wireless device especially useful for locating a cellular telephone making a call from an unknown location. The call may be a request for emergency assistance, or for location-based commercial services, for example. Various embodiments may optionally include a mobile location component, a cellular telephone enabled to chirp-on-demand, and/or an interferometer link. A mobile location component may include a directional antenna. The directional antenna may be mounted on an antenna boom on top of an emergency vehicle, for example. The mobile location component may alternately or additionally comprise a hand-held unit. System elements may cooperate to generate a situation awareness map or other display. The mobile location component may be moved in the general direction of a first location calculation associated with a first circular error of probability. After being moved in the general direction, the mobile location component may cooperate with other elements to determine a second location calculation associated with a second circular error of probability. Second and subsequent location calculations are of increasing precision, enabling an emergency vehicle or attendant to zero in on a cellular telephone.

3 Claims, 14 Drawing Sheets

U.S. PATENT DOCUMENTS

| | | |
|---|---|---|
| 5,945,919 A | 8/1999 | Trask |
| 6,026,304 A | 2/2000 | Hilsenrath et al. |
| 6,031,490 A | 2/2000 | Forssen et al. |
| 6,083,248 A | 7/2000 | Thompson |
| 6,084,547 A | 7/2000 | Sanderford et al. |
| 6,112,095 A | 8/2000 | Wax et al. |
| 6,141,558 A | 10/2000 | Chen |
| 6,236,365 B1 | 5/2001 | LeBlanc et al. |
| 6,240,365 B1 | 5/2001 | Bunn |
| 6,249,252 B1 | 6/2001 | Dupray |
| 6,288,676 B1 | 9/2001 | Maloney |
| 6,314,281 B1* | 11/2001 | Chao et al. ............. 455/404.2 |
| 6,329,904 B1 | 12/2001 | Lamb |
| 6,421,009 B1 | 7/2002 | Suprunov |
| 6,741,863 B1* | 5/2004 | Chiang et al. .......... 455/456.1 |
| 6,792,262 B1* | 9/2004 | Yamanaka et al. ....... 455/404.2 |
| 2001/0018639 A1 | 8/2001 | Bunn |
| 2001/0036833 A1 | 11/2001 | Koshima et al. |
| 2002/0005804 A1 | 1/2002 | Sunprunov |
| 2002/0027512 A1 | 3/2002 | Horita et al. |
| 2002/0122003 A1 | 9/2002 | Patwari et al. |
| 2003/0222820 A1* | 12/2003 | Karr et al. .................. 342/457 |
| 2004/0029558 A1* | 2/2004 | Liu ......................... 455/404.2 |

OTHER PUBLICATIONS

"EMS Communications Policy Manual", Montgomery County, Pennsylvania, Department of Public Safety, Division of Emergency Medical Services, Montgomery County EMS Communications Manual, Sep. 2002.

"Aircraft Rescue and Firefighting Communications", Advisory Circular, U.S. Department of Transportation, Federal Aviation Administration, Jul. 1, 1999.

Tomi Sarvanko, "Positioning Standards E911, E112 and UMTS".

"Wireless Evolution".

* cited by examiner

METHOD AND APPARATUS FOR LOCATING A WIRELESS DEVICE

This application claims benefit to U.S. provisional patent application No. 60/422,202 filed Oct. 30, 2002, which is hereby incorporated by reference.

The present invention relates generally to wireless communications, and more particularly to the provisioning of emergency services and location-based services using a wireless network.

Cellular phone users need prompt, effective emergency services that require the certain knowledge of a user's location much the same as wire-line users. In 1996 the Federal Communications Commission (FCC) concluded a Consensus Agreement between wireless carriers and public safety representatives to implement a cellular location service in which carriers are required to provide the location of cell phones requesting emergency assistance by dialing 9-1-1. The E-911 Mandate is structured into two phases. The first phase requires wireless carriers to provide Public Safety Answering Points (PSAP), essentially 9-1-1 dispatchers, with information comprising a telephone number of the call originator and the cellular site location managing the 9-1-1 call. The second phase, mandatory by Dec. 31, 2005, implements more location precision through an Automatic Location Identification (ALI) service.

One previous attempt at E-911 compliance uses a Geographic Positioning Service (GPS) receiver in the mobile unit or handset, classifying it as a handset-centric solution. In this approach, a mobile unit of a wireless network has a GPS receiver embedded therein, so that a position coordinate can be fixed using the GPS satellite network. Once the position coordinate is fixed, it can be transmitted over the wireless network to the servicing PSAP.

Another previous attempt at E-911 compliance makes use of a location Radio Frequency (RF) receiver on the cellular communications tower of a wireless network, classifying it as a network-centric solution.

FIG. 1 shows the present inventor's analysis of a Time Difference Of Arrival (TDOA) method of locating a wireless caller. System 100 comprises at least three towers 102, 104, 106, each equipped with at least one overlay location receiver 108, 110, 112, respectively, for RF detection of emission signals originating from a caller's mobile unit 120. Each overlay location receiver unit 108, 110, 112, shares the legacy infrastructure of system 100 without interfering with existing base station equipment.

To locate mobile unit 120, each overlay location receiver 108, 110, 112, measures the time for the RF signals propagating from mobile unit 120 in a wireless call to reach towers 102, 104, 106. The differences in these temporal measurements are applied to a triangulation algorithm to identify the location of mobile unit 120 within a general area. Once this area is identified, a mobile telephone switching office 122 forwards this location information, along with the mobile number and voice call, to PSAP 124 for emergency services.

In FIG. 1, circle 121 represents a circular error of probability (CEP) that the signal source (mobile unit 120) is contained within the area. A probability may be associated with the circle. Points A, B, and C bound circle 121, so this circle is a three-point CEP. The size of the CEP depends on the signal source location relative to the three towers 102, 104, and 106.

Separately, certain commercial location tracker systems are designed for tracking wildlife. These systems use a radio frequency chirp beacon transmitter and directional receiver. The user follows a vector decoded by the directional receiver to the emitting chirp beacon transmitter.

In a preferred embodiment of the present invention, a cooperative element location system includes a cellular telephone that is located at an unknown location and may be moving. The system also includes a mobile location component used to zero in on the cellular telephone's location. The mobile location component may be mounted in an emergency vehicle equipped with a directional antenna bar, for example. As the vehicle approaches a first CEP area, the system elements cooperate to generate second and subsequent CEP's of increasing accuracy and decreasing size. The elements may include a mobile location component, one or more cellular telephone tower location receivers, a cellular telephone, and an optional chirp-on-demand signal. In this manner, the mobile location component may provide an emergency vehicle with increasingly accurate estimates of a cellular telephone location, as the vehicle moves toward the general area of that location. An attendant may then take a hand-held device and carry it inside a building, for example, where the elements continue their cooperation to lead the attendant precisely to the cell phone location within the building. An optional interferometer link between cells may further enhance precision.

DETAILED DESCRIPTION OF THE PREFERRED EMBODIMENT

Figure 1:
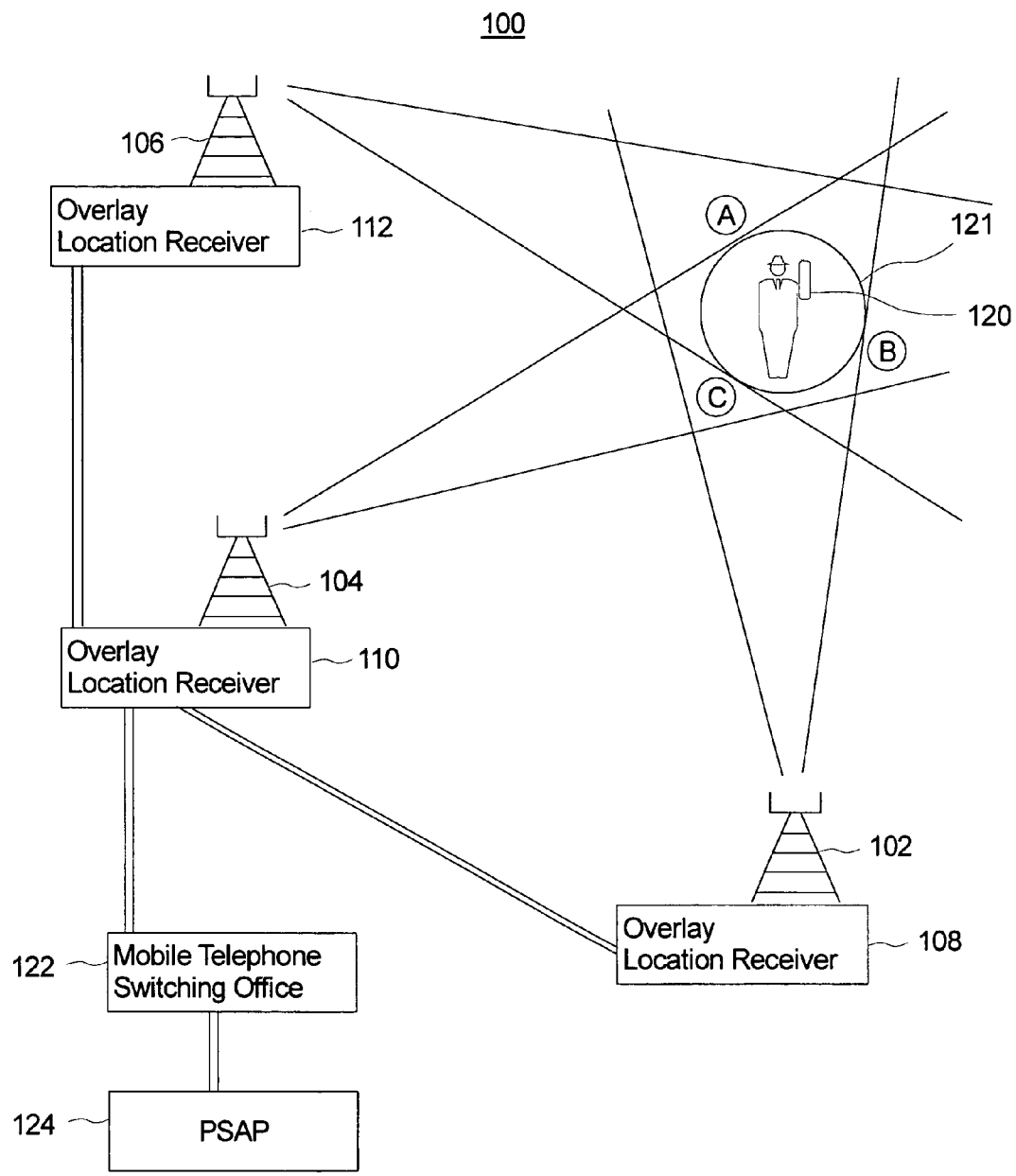
FIG. 1 is a diagram of a time of arrival solution to locating an emitter.
Figure 2:
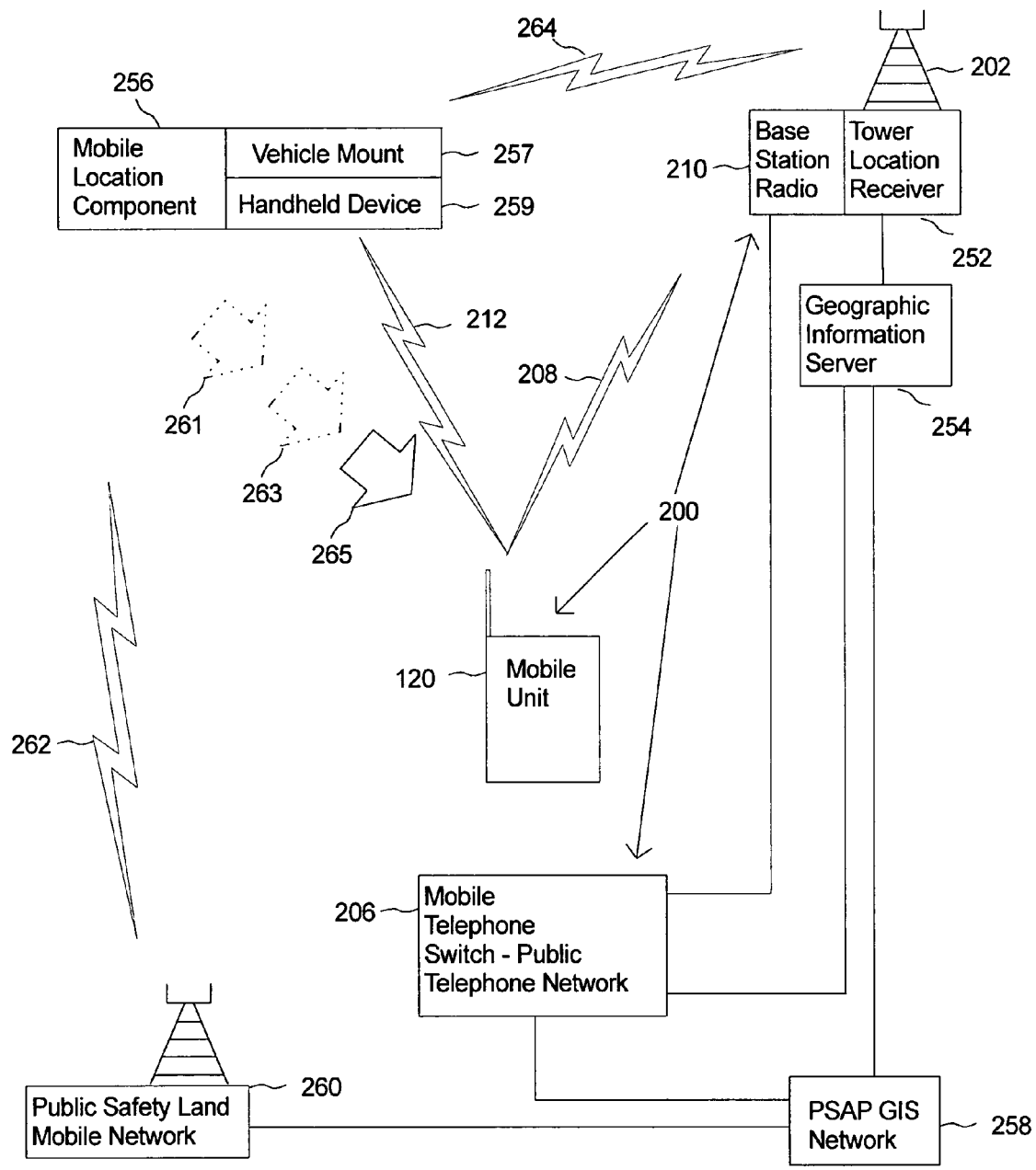
FIG. 2 is a diagram of a cooperative element location system in the context of a wireless communication network.

Referring now to FIG. 2, a wireless communication network 200 is shown comprising at least one communications tower 202, at least one mobile unit 120, and a mobile telephone switch/public telephone network 206.

Communication tower 202 receives a first signal 208 from mobile unit 120 when a user of mobile unit 120 initiates a cellular call. In a preferred embodiment, signal 208 may be a radio frequency (RF) signal. In accordance with normal cellular operation, a base station transceiver 210, operatively coupled to the at least one communication tower 202, processes signal 208. Using digital signal processing techniques, base station radio transceiver 210 analyzes signal 208 to determine whether mobile unit 120 is authenticated for service.

Under current cellular protocols, a mobile unit's unique Electronic Serial Number (ESN) provides the basis for cellular authentication. Mobile unit 120 transmits its ESN to tower 202 when a call is initiated. Base station transceiver 210 analyzes signal 208 to determine the ESN of mobile unit 120. The ESN is referenced in an authentication database, which indexes the ESN to a user's account information. Once the ESN is authenticated, base station radio 210 issues a control channel and channel assignment. The channel may be assigned in frequency, time, or code representative of the network technology.

Upon authentication, base station radio transceiver 210 analyzes signal 208 to retrieve the dialed digit sequence. The call is connected to mobile telephone switch/public telephone network 206. The dialed digit sequence determines call routing and final destination.

Now, in accordance with one embodiment of the invention, a cooperative element location system 250 comprises a tower location receiver 252, a Geographic Information Server (GIS) 254, and a mobile location component 256. Tower location receiver 252 is operatively connected with communication tower 202, and configured to determine a first location calculation of mobile unit 120. Tower location receiver 252 receives signal 208 from mobile unit 120. Tower location receiver 252 decodes signal 208 to search for a special predetermined sequence of digits, which indicate a need or request for an emergency or non-emergency location-based service. For example, these digits may include 9-1-1, indicating a request for emergency services, 4-1-1, indicating a request for information services, 5-1-1, indicating a request for yellow pages (business directory) services, a sequence of digits for roadside assistance, or some other predetermined sequence. Preferably, the sequence may consist of three digits.

If tower location receiver 252 does not identify any of the predetermined sequences indicating that there is no request for emergency or non-emergency location-based services, no further action is taken. However, if the dialed digits represent a request for an emergency service or a non-emergency location-based service, tower location receiver 252 performs a location measurement on signal 208.

The location measurement includes a range measurement and bearing measurement, which in combination can determine an approximate location of mobile unit 120 relative to the location of tower 202. GIS 254 converts the measurements to a first location calculation of mobile unit 120.

Depending on the nature of environmental circumstances and the distance of mobile unit 120 from tower 202 at the moment tower location receiver 252 takes the location measurement, the first location calculation may not meet E-911 performance and accuracy requirements. However, the first location calculations will meet the needs of many non-emergency location-based services.

The first location calculation is a map space location comprising a latitude and longitude position of mobile unit 120.

In one embodiment, GIS 254 may be further configured to calculate a Circular Error Probability (CEP) measurement. A CEP measurement provides statistical probabilities as to the accuracy of the location calculation.

In an alternative embodiment, the tower location receiver 252 itself may be equipped to calculate the first location calculation and/or the CEP measurement, which are subsequently forwarded to GIS 254.

If mobile unit 120 has requested a non-emergency location-based service, GIS 254 forwards the location calculation to mobile telephone switch/public telephone network 206, along with the digit sequence so network 206 may appropriately route the location calculation. The location calculation may be routed to a commercial service providing location-based information to mobile unit 120. In other embodiments, GIS 254 can provide the commercial service GIS 254 routes the first location calculation and any CEP measurement to a servicing PSAP GIS network 258. This link can be a dedicated connection, or alternatively, packet routed through mobile telephone switch/public telephone switch 206 to PSAP GIS network 258.

PSAP GIS network 258 receives the location calculation and any CEP measurement so that a PSAP operator can analyze location information, including the location calculation and any CEP measurement, to efficiently manage the progress to the site of the emergency.

PSAP GIS network 258 dispatches a vehicle or attendant over public safety land mobile network 260 to a general area identified by the first location calculation in cooperation with any available CEP accuracy measurement. Public safety land mobile network 260 is representative of the Private Land Mobile Radio Network used by police, fire, and medical services in accordance with 47 CFR § 90. A PSAP operator vocally confers the general location of the emergency site, which is inherently the location of mobile unit 120, using a first voice channel of an RF signal 262 on public safety land mobile network 260.

Mobile location component 256 may for example comprise a vehicle mount 257 and/or a hand-held device 259. Mobile location component 256 may be in physical association with an emergency vehicle or attendant proceeding to the site of an emergency, and is positioned some distance from mobile unit 120 in accordance with the first location calculation. Upon receipt of the first location calculation, mobile location component 256 is moved in the general direction of mobile unit 120 as indicated by arrow 261.

Mobile location component 256 is configured to determine a second location calculation of mobile unit 120. Mobile location component 256 is configured to receive a second, data channel of RF signal 262 having parameter exchange protocols for receiving data necessary for fixing and tracking signal 212 from mobile unit 120. In a preferred embodiment signal 212 may be an RF signal similar to signal 208. The data includes the unique ESN of mobile unit 120 and its control channel and channel assignment issued by base station transceiver 210. Using this data, mobile location component 256 is initialized to lock to signal 212.

It should be appreciated that while mobile location component 256 is configured to receive both the voice and data channel of signal 262 in the present embodiment, other embodiments include a mobile location component configured to receive the data channel of signal 262, while a separate radio receiver is configured to receive the voice channel of signal 262.

In still yet another embodiment, a radio receiver may be capable of receiving the voice channel and data channel of signal 262.

Most emergency vehicles or attendants communicate with dispatchers using two-way data/voice radios communicating over RF modulation signal 262 to public safety land mobile network 260. These radios are sophisticated in that they can multiplex several low rate channels into one high-speed air link. For example, the Federal Communications Commission (FCC) has opened up the UHF band for land mobile radios capable of 25.6 Kbp/s. These are commercial units with a voice channel and multiple RS-232 data channels, enabling the addition of data protocols to the voice signal simultaneously without interferences. Accordingly, mobile location component 256 cooperates with an existing radio configured to receive the data from public safety land mobile network 260. The data, which require a low data rate channel, may be transmitted over one of the multiple RS-232 data channels. Alternatively, mobile location component 256 comprises a receiver for receiving the data directly from signal 262 over public safety land mobile network 260.

As the emergency vehicle or attendant approaches mobile unit 120 so does the associated mobile location component 256 as shown by arrow 261. Mobile location component 256 will acquire signal 212 at some distance from mobile unit 120. If tower location receiver 252 performs the first location measurement on a good signal, there will be sufficient information to engage mobile location component 256 with signal 212 at several miles from mobile unit 120. Once engaged, mobile location component 256 performs a new location measurement for determining a second location calculation.

As the distance decreases between mobile location component 256 and mobile unit 120, mobile location component 256 refines the measurement, which becomes increasingly more accurate relative to the actual location of mobile unit 120 as shown by arrow 263. This process continues until the highest accuracy is achieved as mobile location component 256 converges upon mobile unit 120 as shown by arrow 265 mobile location component 256 continuously transmits a refined measurement over public safety land mobile network 260 to GIS 254. GIS 254 continuously calculates and refines the second location calculation of mobile unit 120. Any CEP measurement may also be refined to reflect the updated location measurement. PSAP GIS network 258 receives the second location calculation to assist the PSAP operator in efficiently coordinating emergency services.

In the present embodiment, mobile location component 256 includes a beacon transmit unit for transmitting a tracking beacon signal 264 for determining the present location of mobile location component 256 and consequently the location of the associated emergency vehicle or attendant. To initiate the tracking beacon, a PSAP operator requests a tracking channel be assigned for the beacon. The request alerts tower location receiver 252 to look for the tracking beacon signal 264. The request crosses the network demarcation and is received by GIS 254 and forwarded on to tower location receiver 252. The tracking channel will be on or near the frequency channel used by mobile unit 120. Tower location receiver 252 differentiates the modulation of the tracking signal to process with little interference. Tracking beacon signal 264 is not on continuously but on for only a low duty cycle to limit its interference with the voice channel of signal 208. Tracking beacon signal 264 is specifically designed for location accuracy. In fact, if the tracking beacon source is moving, this should negate some propagation path ambiguities providing even more location accuracy. Tracking beacon signal 264 carries this location data information at regular intervals to communication tower 202, where tower location receiver 252 receives tracking beacon signal 264, decodes tracking beacon signal 264, and forwards the location data to PSAP GIS network 258. Because there is a chance that more than one tracking beacon signal 264 is being transmitted if CELS 250 is servicing other emergencies, each tracking beacon signal 264 is assigned a unique beacon identification code so tower location information receiver 252 looks for tracking beacon signal 264 and appropriately associates the emergency services of mobile unit 120, and not another mobile unit requesting emergency services. In this manner, an operator at PSAP GIS network 258 who is handling the emergency service request from mobile unit 120 will receive the correct location data of the vehicle or attendant reporting to the emergency site. The PSAP operator can provide updated progress reports to the user of mobile unit 120 as to the current location of the vehicle or attendant reporting to the scene of the emergency through voice communication. The beacon allows the cell tower receiver to refine the coefficients used in the location algorithm and to improve the accuracy.

In one embodiment, the beacon transmit code is uniquely built into the beacon transmit unit of mobile location component 256 and associated with the emergency vehicle of the attendant by way of manual entry into PSAP and forwarded to GIS 254 and eventually tower location receiver 252 at the appropriate time.

In another embodiment, the beacon transmit code is uniquely generated by PSAP GIS network 258 and uploaded to the beacon transmit unit as needed.

While the present embodiment discloses the beacon transmit unit as an integral member of mobile location component 256, the tracking unit may be independent in alternative embodiments.

Figure 3:
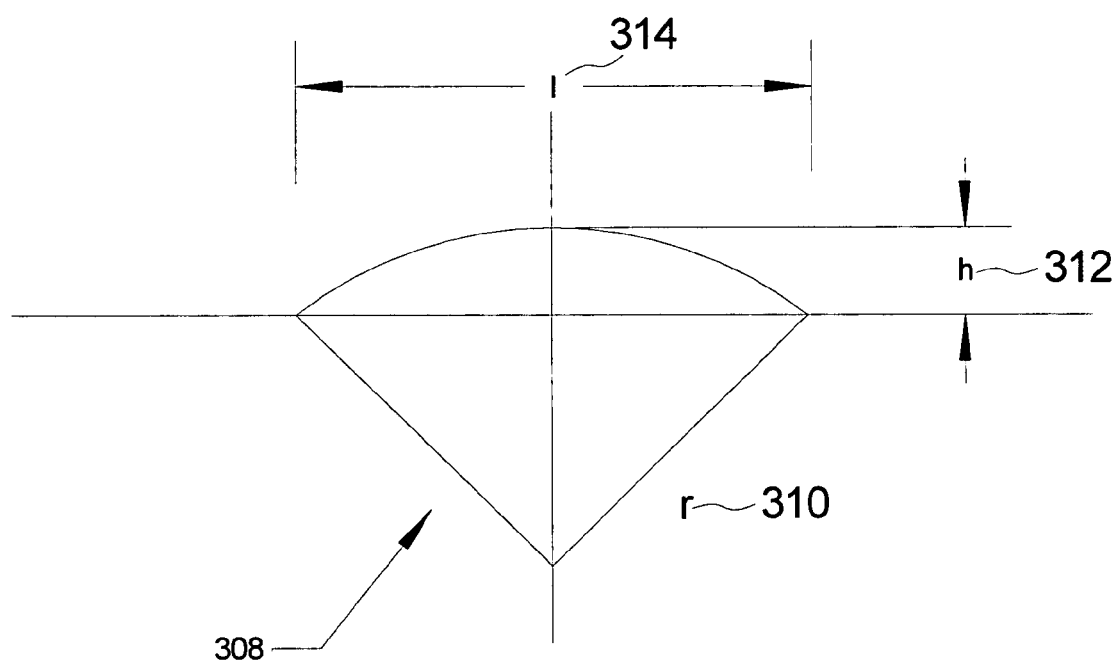
FIG. 3 is an exaggerated graph of a radiation pattern.

The first location calculation and the second location calculation performed by GIS 254 is now discussed, including range and bearing measurements taken for achieving these location calculations is now described. Referring to FIG. 3, a mobile unit radiation pattern 308 representative of signal 208 received by tower location receiver 252 or signal 212 received by mobile component 256 is shown. Mobile unit radiation pattern 308 is characterized by radius ("r") 310, length ("l") 314, and height ("h") 312.

The receive signal level (RSL), from which the bearing and range measurements can be obtained, should follow the "one over distance squared" law for a propagating spheroid surface, where power density is a function of the spheroid surface area. Because the originating mobile unit signal antenna power generally is limited to 600 milliwatts, the radiation sphere volume will always contain the 600 milliwatts. However, as the sphere grows, the surface energy density in watts per square meter follows the rule for a spherical sector:

$$A_t = 3\pi r^2$$

where $A_t$ is the area of the spherical sector surface, and $$V = \frac{2\pi r^2 h}{3}$$

where V is the volume of the spherical sector which estimates free space loss $L_f$ of the signal.

In assuming r is the location distance vector, h is assumed the error. For short distances r, error h will be noteworthy, and for long distances r, error h will be negligible. However, a sphere is not always a practical radiation pattern due to the reflection and absorption properties of Earth's surface. Earth's surface becomes a reflector under certain conditions and an absorber of signals under other conditions. The radiation pattern may be more hemispherical in practice.

To calculate range and bearing of an RF signal, certain assumptions need to be made about its power density. Those assumptions include free space signal loss plus a number of additional factors. Those factors can be lumped into an average aggregate value that varies by climate and environmental conditions or time of year. For example, if rainy weather conditions exist, signal loss would be expected to be higher. Heavy downpours absorb more signal than light rainfall, so rainfall rate is an important factor. Fog and temperature inversions also play a modest part. Therefore $L_p$ is total propagation loss consisting of free space loss $L_f$ and climate loss $L_c$. Most Communication towers each have several antennas with two or more to a cell face. Each antenna is connected to at least one channel and space diversity could apply. By way of example let antenna gains be respectively $G_{T1}$ and $G_{T2}$ where T1 represents tower antenna one and T2 represents tower antenna two and so forth. The mobile unit's antenna gain is $G_p$. Total gain per channel ($G_1$, $G_2$, respectively) is then:

$$G_1 = G_{T1} + G_p$$

and $$G_2 = G_{T2} + G_p$$

Then RSL for each channel becomes:

$$RSL_{L1} = (G_{T1} + G_p) - (L_f + L_p) + P_t$$

and $$RSL_{L2} = (G_{T2} + G_p) - (L_f + L_p) + P_t$$

where $P_T$ is the mobile unit's transmit power.

RSL is measured by tower location receiver 252.

$G_{T1}$ and $G_{T2}$ are known variables. While $G_p$ is not known, it may be accurately estimated by an assumption. $G_p$ may be a small negative value when using a hand held mobile unit and a small positive value when using an automotive installation. $L_p$ can be derived from a signal strength profile such as published data. Each communication tower has a signal strength profile from measured values at the time of tower construction, and are necessary to determine handoff from tower to tower. This data can also be used to determine propagation losses. Alternatively, the signal strength profile may be measured by an interferometer or some other accurate means.

Although not required by the present invention, tower-to-tower communications can be used to more accurately compute propagation losses as part of a rough interferometer setup, especially under current atmospheric weather conditions. For example, if a calibrated power level signal is put on a calibrated transmission line to a calibrated antenna, then path loss could be measured. Knowing the propagation velocity, location accuracy can be improved.

Free space loss may be computed from tower face to tower face and any extra loss is mostly due to climate and fading factors. Therefore, all the variables of the $RSL_{L1}$ equation are known except for $L_F$ for which it is solved. Range and bearing may be calculated therefrom. The range and bearing measurement provide an estimate of the location of the mobile unit.

At this point no provision has been made for noise interference. However, a noise figure can be included in $L_p$. Therefore, an accurate expression can be developed to compute range and bearing from a single communication tower or a single mobile location information component. Although not required by the present invention, multiple communication towers can compute a range and bearing measurement on a single mobile unit provided that multiple towers can receive a signal from the mobile unit. This may improve location accuracy. In this case, the original serving tower carrying the voice call has a means to indicate that it is the prime serving location receiver, so as to insure an emergency request be forwarded to the appropriate PSAP network servicing the caller's area.

While not required by the above-disclosed embodiment, the present invention may additionally or alternately incorporate a mobile unit configured to transmit a cooperating chirp-on-demand signal to improve location performance. This chirp-on-demand signal significantly improves the accuracy of the first location calculation, as well as the fine location calculation. A chirp-on-demand signal would offer additional accuracy not available with normal RF emissions from mobile unit 120 and a single communication tower solution. While emergency services will benefit from a chirp-on-demand signal, it is especially significant to commercial services that most likely do not have the benefit of implementing mobile location component 256. The chirp signal, consisting of a known frequency and a calibrated time duration between chirp bursts, provides a reasonable accurate location determination resolving enough location ambiguity for commercial revenue generation using a single communication tower 202. These "radar-like" chirp signals provide resilience to RF interference and to low quality RF path propagation. The chirp-on-demand signal does not interfere with ongoing functions even while within signal 208 or signal 212 of mobile unit 120. The chirp-on-demand signal weaves into a voice call while one is ongoing.

Chirp-on-demand works by varying the amplitude and frequency of signal 208 and signal 212 from mobile unit 120 in a known, accurate pattern. Tower location receiver 252, or optionally, mobile location component 256, can extract known propagation variables from signal 208 or signal 212 using digital signal processing techniques. By analyzing these additional propagation variables, the RSL can be calculated to a more precise measurement.

In this alternative method, mobile unit 120 is capable of providing a calibrated chirp-on-demand signal. With respect to government performance and accuracy requirements, the chirp method may be able to meet the accuracy specification without the use of a mobile location component 256 in many situations such as, for example, flat terrain areas.

Figure 4:
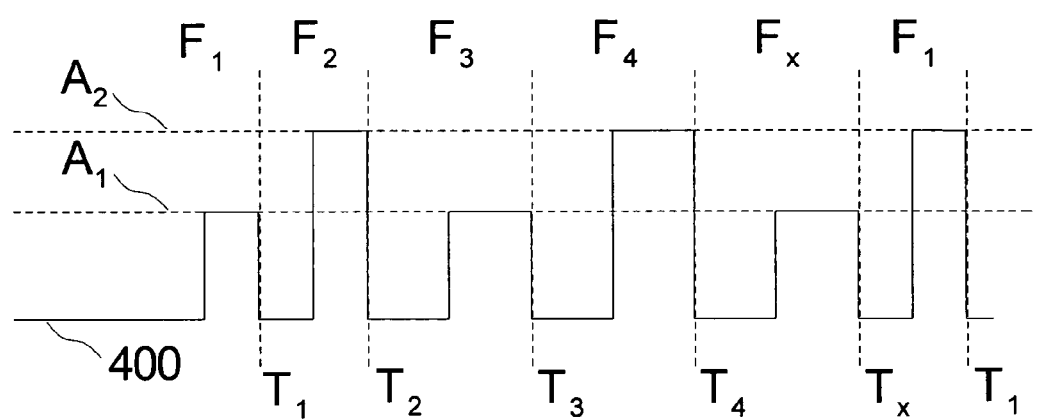
FIG. 4 is a timing diagram of a chirp-on-demand signal.

FIG. 4 shows an example of a segmented, calibrated chirp signal 400 weaved into signal 208. In order to alter the frequency pattern of signal 400, a calibrated time and calibrated time interval $T_1, T_2, \ldots T_x$ has been added.

In one embodiment of chirp-on-demand, mobile unit 120 is configured to uplink or receive absolute time as part of the RF protocol then some form of system synchronization is possible. Time intervals $T_1, T_2, \ldots T_x$ may also be added by mobile unit 120 itself. Knowing absolute time and time intervals $T_1, T_2, \ldots T_x$, the propagation path then can be thought of as an unknown delay line. At ingress of this delay line, the calibrated time signal is injected, eventually yielding calculated information about path range. Propagation velocity variations across the cell space will be minimal because propagation velocity generally will be uniform. Propagation velocity can be measured from tower to tower as part of a rough interferometer setup.

With knowledge of the propagation velocity and time intervals $T_1, T_2, \ldots T_x$ of chirp signal 400, range accuracy is improved.

Frequency likewise sometimes detects changes in path length and direction. Changes in RSL due to chirp frequency variations would help average out the measured RSL.

Likewise, calibrated chirp amplitude variations $A_1 \ldots A_x$ will help average out RSL amplitude deviations. If, for example, a chirp code comprises a 3 dB change in amplitude, but the tower receiver only receives a 2.5 dB change in amplitude, then most likely diffraction is deducting from the measured RSL and would be 0.5 dB higher than the computed RSL. This helps to improve RSL accuracy.

This demonstrates that chirp-on-demand can improve range accuracy as measured by the cell tower location receiver and add improvement to commercial location services.

Figure 5:
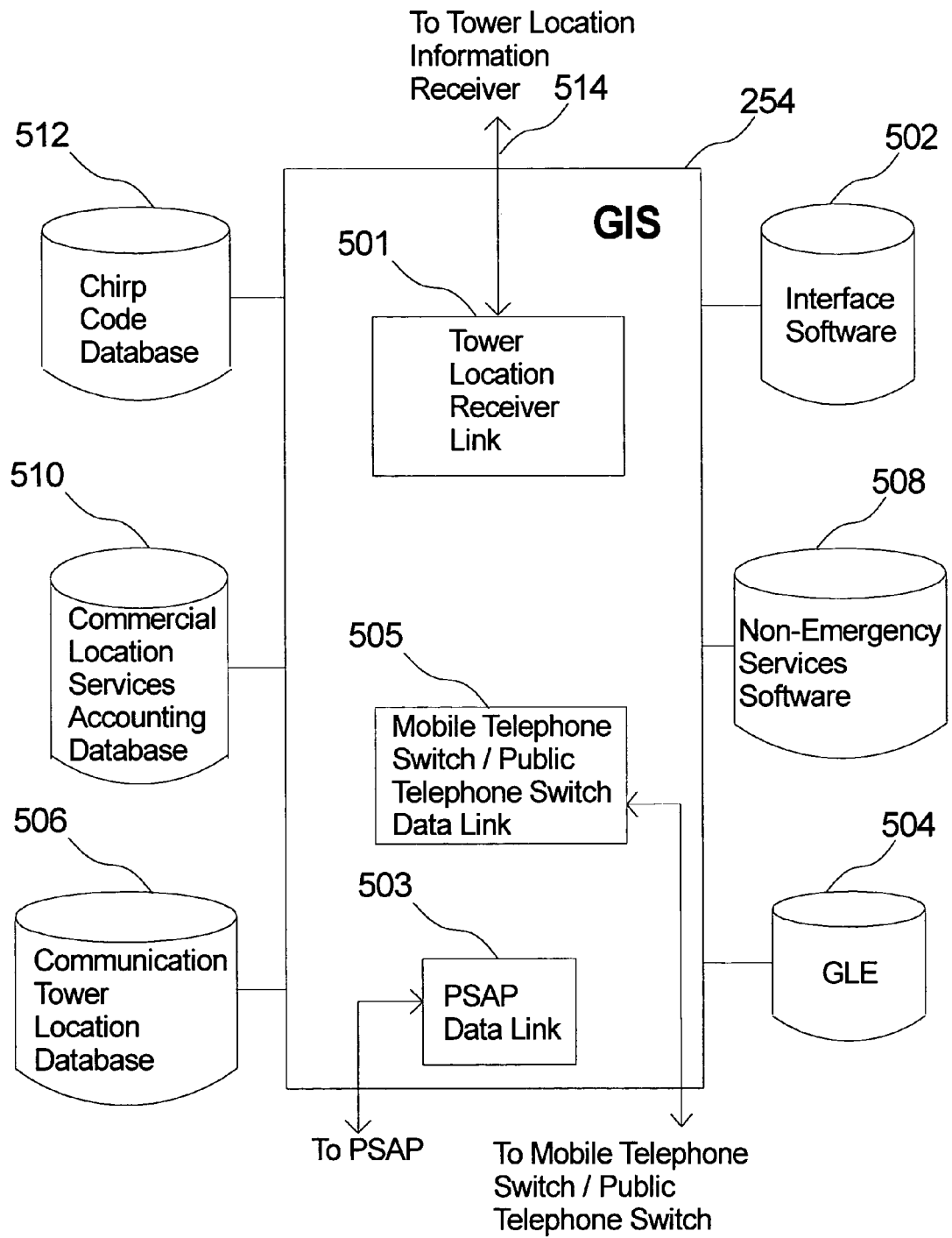
FIG. 5 is a diagram of an exemplary geographic information server.

Referring now to FIG. 5, one embodiment of GIS 254 is shown. GIS 254 integrates between commercial and emergency services by providing a common denominator for both.

A demarcation point may exist between PSAP GIS network 258, which is a publicly serviced network, and GIS 254, which would most likely be privately serviced by a wireless carrier. GIS 254 comprises a tower location receiver data link 501, a PSAP network data link 503, and a mobile telephone switch/public telephone switch data link 505. A common message format enables interoperability and the transfer of data from one network to the other. The common message format standard could be agreed upon by PSAP interest groups and wireless carrier interest groups.

GIS 254 comprises interface software 502 that establishes a common message format. Interface software provides protocols for the transfer of data including a range and bearing measurement, a latitude and longitude position, a CEP measurement, unique codes, RF signal intercept data, or other data as well, across tower location receiver data link 501, PSAP data link 503, and mobile telephone switch/public telephone switch data link 505.

Where GIS 254 is at a demarcation point between a wireless carrier's network and PSAP GIS network 258, interface software 502 implements the appropriate protocols for communication therebetween. Interface software 502 facilitates communication of GIS 254 with tower location information receiver 252, PSAP GIS network 258, and mobile location component 256.

GIS 254 comprises a geographic location engine (GLE) 504 configured to generate a map space location from the first measurement from tower location receiver 252 and, in the case of an emergency service request, the second measurements from mobile location component 256.

GIS 254 includes a communication tower location database 506 comprising a unique identification number for each of a plurality of communication towers and corresponding geographic locations. These geographic locations are in a map space, comprising latitude and longitude positions. In this manner, a single GIS may service a plurality of communication towers.

Interface software 502 receives a location measurement from tower location receiver 252 along with the identification number of servicing tower 202. GLE 504 generates the location calculation of mobile unit 120 by searching database 506 for the identification number and upon finding a matching identification number, calculating the location calculation from the corresponding geographic location of servicing tower 202 and the location measurement.

In some embodiments, GLE 504 will geocode the latitude and longitude position to a street address using methods familiar in the art. This is most likely useful for commercial services, or for third party commercial vendors who do not provide their own geocoding software offsite. GLE 504 may geocode to street addresses for emergency services, although this is more likely to be handled by PSAP GIS network 258 to comply with specific geocoding performance standards.

Non-emergency services software 508 provides non-emergency location-based services that may be requested by mobile unit 120. These services may include navigation directions, commercial location information on restaurants or retail outlets in the geographic area of mobile unit 120, etc. GIS 254 may log such transactions in a commercial location services accounting database 510, such as by the ESN of requesting mobile unit 120 for accounting purposes. Alternatively, if a subscriber business methodology is employed, GIS 254 first references the requesting ESN in commercial accounting database 510, and upon a match, non-emergency services software 508 provides the requested service.

If cooperative element location system 250 employs the chirp-on-demand capability, GIS 254 is operatively configured to a chirp code database 512. Chirp code database 512 accommodates a pool of chirp codes. When a request for emergency or non-emergency location-based service is received, tower location receiver 252 decodes the dialed digit sequence and engages location-based services by sending the ESN to servicing GIS 254 via data link 501. GIS 254 receives the ESN at connection 514 and a database is searched for a matching ESN to identify whether requesting mobile unit 120 is chirp capable.

If no match is found, a message indicating that the chirp feature is not possible is sent back to tower location receiver 252. Tower location receiver 252 takes bearing and range measurements without searching for a chirp signal. GIS 254 calculates the first location calculation as previously described.

However, if a match is found indicating mobile unit 120 has the chirp-on-demand capability, GIS 254 retrieves a chirp code from the chirp code pool in database 512. GIS 254 sends this chirp code to base station radio transmitter 210 to transmit the code to mobile unit 120.

Mobile unit 120 receives the chirp code and transmits the chirp code in signal 208 and signal 212 so that tower location receiver 252 can make the first location measurement and, in the case of an emergency service request, mobile location component 256 can make the second location measurement.

In the case of the emergency service request, the chirp signal continues intermittently until mobile location component 256 converges upon mobile unit 120, indicating that the emergency attendant has reached mobile unit 120, or is terminated by PSAP GIS network 258. In the case of a non-emergency service request, the chirp signal continues intermittently until tower location receiver 252 completes the first location measurement. In either case, GIS 254 notifies mobile unit 120 via communication tower 202 to kill its chirp. GIS 254 returns the chirp code to the available chirp code pool in database 512.

In the case of an emergency service request, PSAP GIS network 258 is configured to receive location information from GIS 254 via PSAP network data link 503 to generate a situation awareness map.

Figure 6:
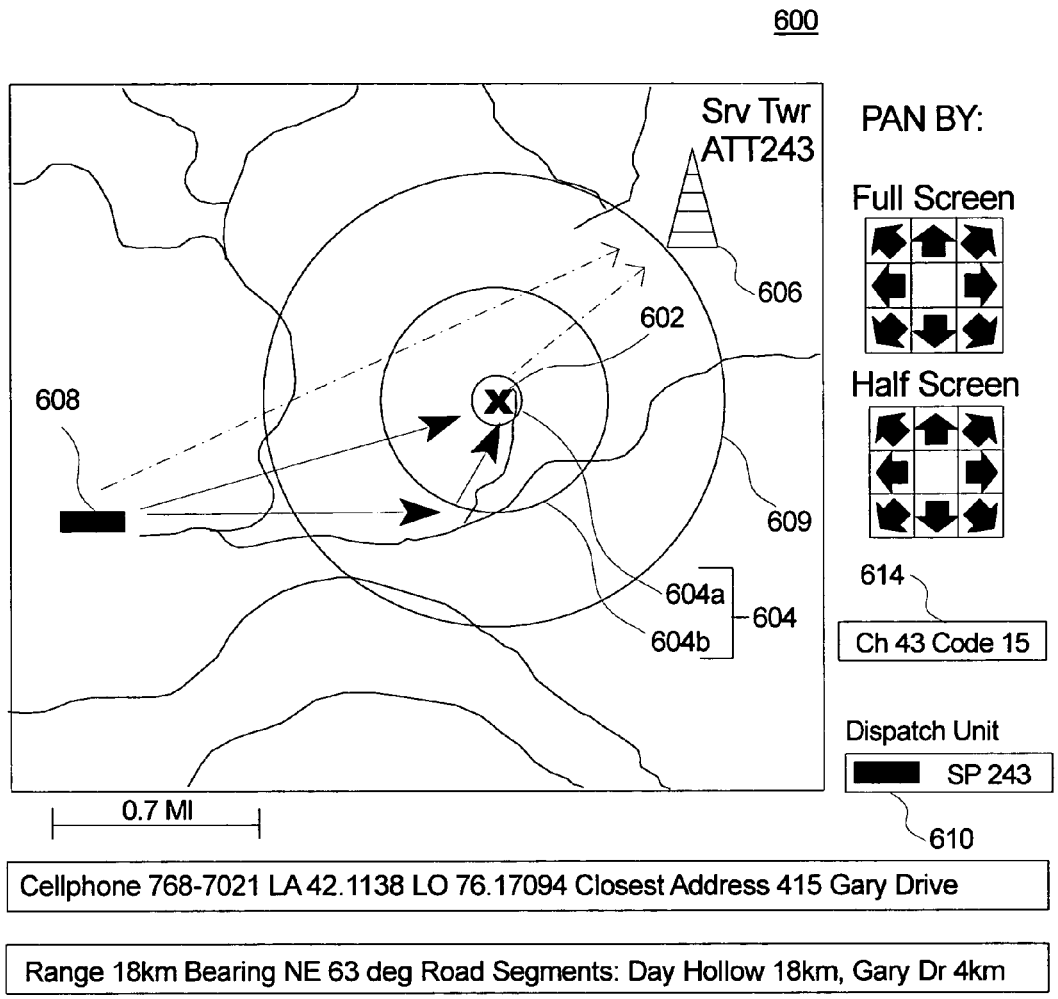
FIG. 6 shows a graphical user interface for use with the present invention.

FIG. 6 shows one embodiment of a situation awareness map graphical user interface (GUI) 600 for use by a PSAP operator of PSAP GIS network 258. GUI 600 updates the PSAP operator as the emergency situation develops. The geographic map data of GUI 600 may be provided by PSAP GIS network 258.

GUI 600 includes map space location data, including a location icon 602 of mobile unit 120 layered with geographic data.

Mobile unit location icon 602 is first displayed in accordance with the first location calculation, and adjusted according to the continual updates from the second location calculation received by GIS 254. GUI 600 displays a CEP measurement 604 to the operator, each outlying circle representing an area with an associated location probability of mobile unit 120. For example, GUI 600 shows a CEP measurement comprising two CEP estimations 604*a*–*b*. Innermost CEP estimation 604*a* may represent a 60% probability that mobile unit 120 is within the encirclement. Outermost CEP estimation 604*b* may represent a 90% probability that mobile unit 120 is within the encirclement.

GUI 600 shows communication tower icon 606 in accordance with the map space location of servicing communication tower 202. Communication tower icon 606 is complemented with the tower identification number, so that the PSAP operator has this information readily available if needed.

GUI 600 displays a mobile component location icon 608 in accordance with the map space location of mobile location component 256 assists the PSAP operator in initially vectoring the emergency attendants to a signal intercept area represented by signal intercept circle (SIC) 609. The PSAP operator vectors the emergency attendant to SIC 609, at which point, mobile location component 256 should pick up signal 208 of mobile unit 120 for performing the second location calculation.

GUI 600 optionally shows dispatch unit identification 610, a unique identifier of the attending dispatcher unit.

GUI 600 optionally shows a channel and code number 614 over which the PSAP operator is communication on the public safety land mobile network 260 to the emergency attendant.

Figure 7:
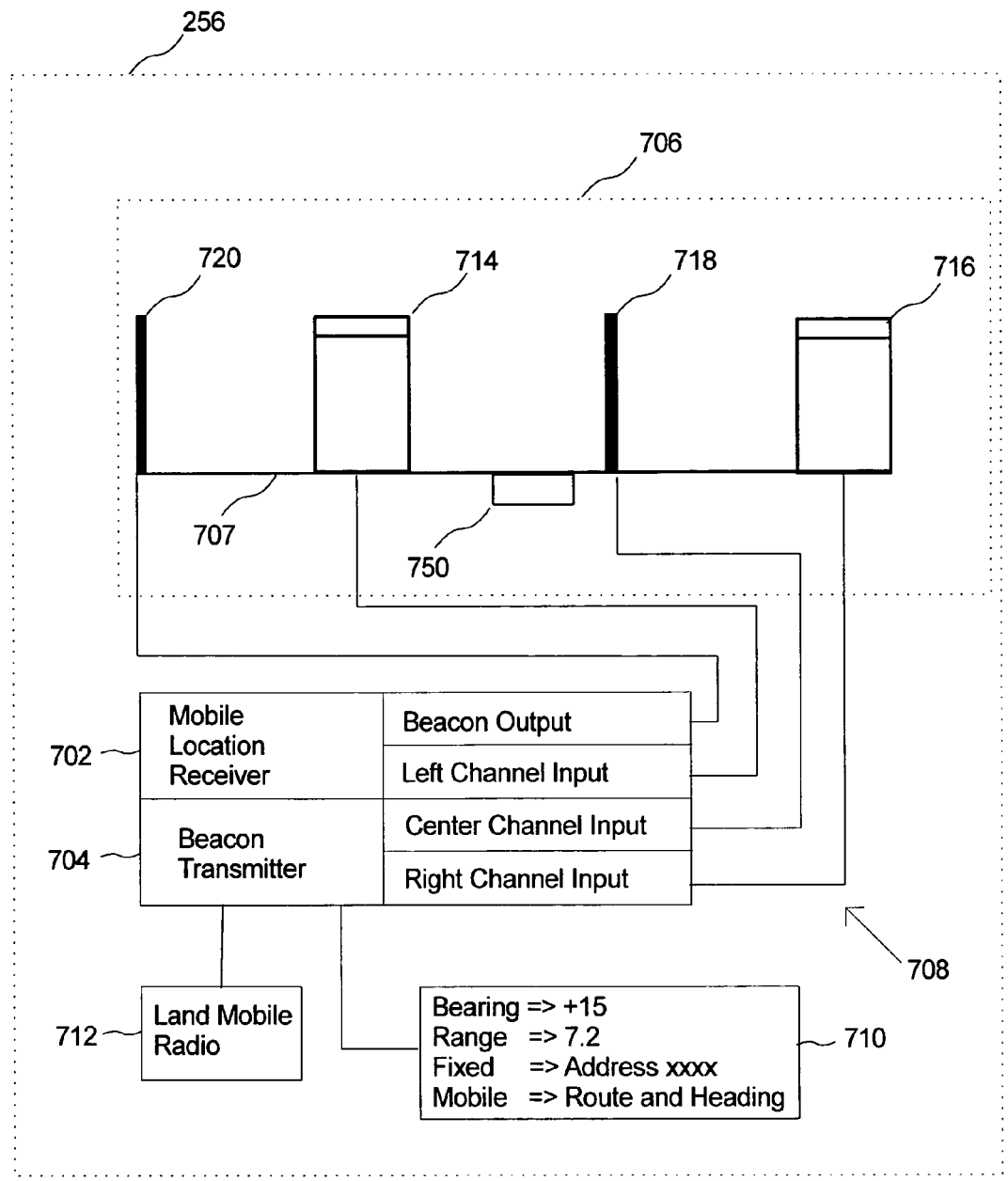
FIG. 7 is a diagram of a mobile location component including an antenna boom.

Referring now to FIG. 7, one embodiment of mobile location component 256 is shown. Mobile location component 256 may be a vehicular unit and/or a hand-held unit. The vehicular unit fits into an emergency vehicle without requiring significant modifications to the vehicle. The vehicular unit will generally be more sensitive to RF emissions from mobile unit 120 than a handheld unit because a vehicular unit can be operatively coupled with a larger antenna size. A handheld unit may be appropriate to function inside buildings or between buildings where a vehicular unit proves impractical. If target mobile unit 120 is in an area that is hard to see or navigate, or in a high-rise building, the emergency attendant can easily switch from a vehicular unit to a handheld unit when necessary.

In one embodiment, mobile location component 256 is a hand-held unit that plugs into a vehicle-mounted antenna. For example, a vehicle may have a cradle for placing a hand-held device in communication with a directional antenna bar on the roof. When desired, the hand-held device may be removed from the cradle and employ its own built-in antenna for use outside the vehicle.

Mobile location component 256 preferably comprises a mobile location receiver 702, a beacon transmitter 704, an antenna 706, a plurality of channels 708, and a display 710. Mobile location receiver 702 may also include or be operatively coupled to a land mobile radio 712 which can transmit voice communication using antenna 706 over public safety land mobile network 260.

Mobile location receiver 702 is operatively configured to receive signal 208 with antenna 706 through channels 708 for making the second location measurement. This may be done using a boom servo technique.

As shown in FIG. 7, antenna 706 may be directional, and may be placed on an emergency vehicle. For example, antenna 706 may comprise a left directional antenna 714, a right directional antenna 716, a half wave whip transmit antenna 720 and a half wave whip receive antenna 718. A navigation solution requires two components, a bearing and a range. A mobile platform such as mobile location component 256 can make successively accurate measurements just by traveling in the direction of increasing signal level. As an alternative to simple directional antennas, omnidirectional antennas consisting of two or more each spatially separated (Reference FIG. 9) at the antenna boom ends coupled with time of arrival and angle of arrival computation techniques can provide bearing information. They can also be used together as shown in this example of FIG. 7. RSL computations provide range information. Together they provide navigation information which can be overlaid on a map. As signals from mobile unit 120 reach antennas 714, 716, mobile location receiver 702 uses a time difference of arrival algorithm that measures an offset time to determine a bearing measurement. Alternatively, an angle of arrival algorithm or other algorithm may be employed. Mobile location receiver 702 calculates the RSL to arrive at a range measurement, providing the range required for the second navigation component.

Figure 8:
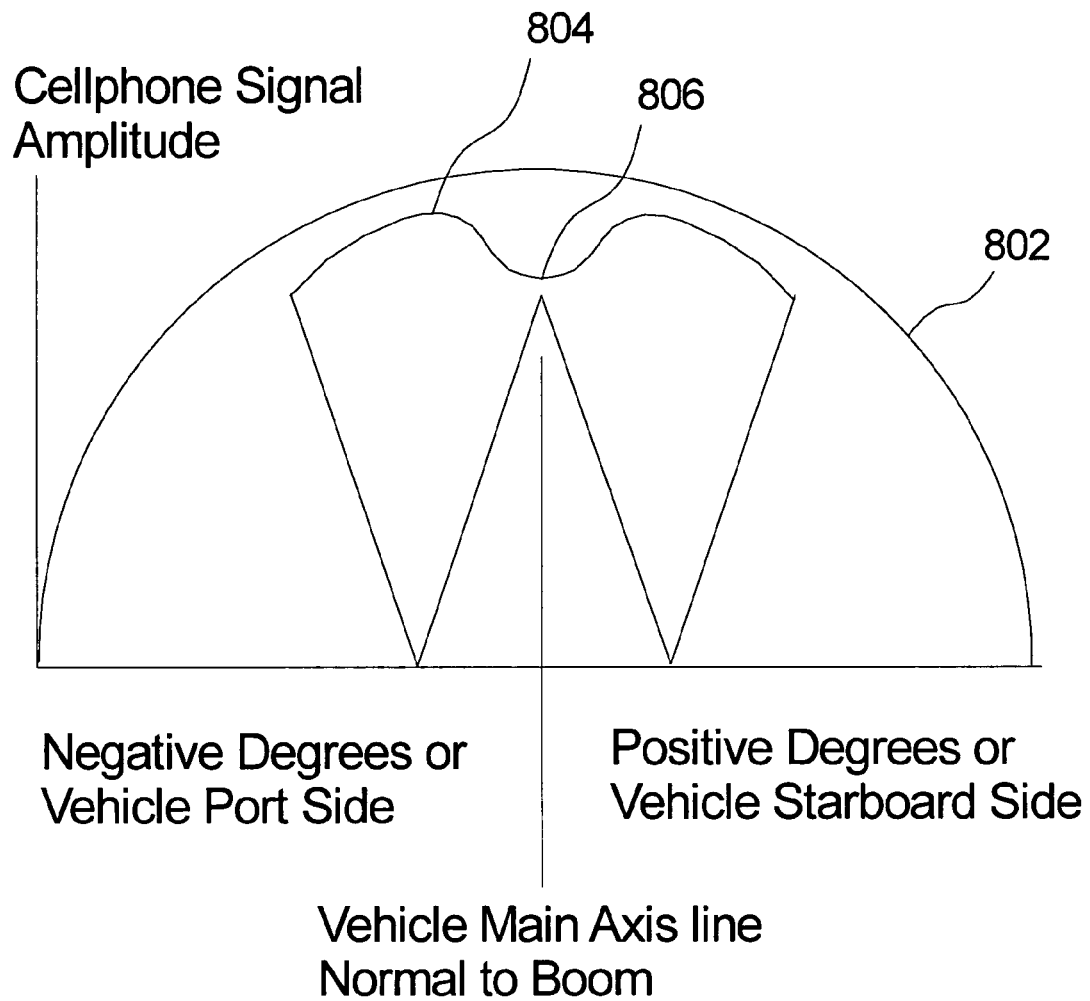
FIG. 8 is a graph illustrating radiation patterns for a directional antenna.

The velocity of propagation in the atmosphere is slightly slower than in free space. The velocity of propagation in free space has been accurately determined to be $2.99792458*10^8$ meters per second by national standards groups. A very small percentage error in the atmospheric velocity calculation will generate a large position error. Atmospheric propagation speeds are dependent on atmospheric air pressure, humidity and temperature. Air pressure and temperature in turn depend on elevation and climatology. Air density is a function of air temperature, altitude and humidity. These factors affect the size of the antenna boom. To make the boom length practical for vehicles and hand held units, mobile location receiver adds a second channel with offset timing signal. In this example the second timing signal is offset from the first by some 500 picoseconds in round numbers or a half of a nanosecond. Small accurate delays can be achieved a number of ways using circuitry components. The important point is to delay the second channel relative to the first by a controlled amount so FIG. 9 can be computed with precision. Delay can be controlled by a number of methods for example extra circuitry path length in one timing signal relative to the other. It could be generated by an extra gate in a FPGA circuit. It can even be crafted by surface acoustic wave devices. In the case where antenna 706 is directional, antenna 706 may have a directional antenna pattern as shown in FIG. 8, for example. An omni-directional antenna (e.g. directional antennas 714 and 716) may have directional pattern 804 within a radius 802. Null point 806 occurs when the antenna boom 707 is on a heading directly toward the mobile unit.

In this example the 500-picosecond time delay gives the ability to run two antennas on a shortened boom to perform wave front angle of arrival computations. In our example of above that would be in this example roughly a meter. The short boom means the antenna boom can fit on a car roof or be hand carried into buildings. Note that the offset time is not fixed but must be variable by some fine level of increments. To detect the wave front, the measured complex signal needs to be exactly the same value on both antennas. To find this point, the offset is varied from a small value to larger values until the antenna signals match. This point is a constant wave front and the delay is the time it took for the wave front to travel to the second antenna. The time delay is related to the boom length. The offset then becomes a normalized angle with respect to the boom and gives direction. When the signal direction is straight ahead of the boom the signal path is the same for both antennas mounted at the boom ends. When the emitter is off to one side, it takes longer for the wave front to reach the farther antenna. By measuring how long it takes we can compute the angle to the boom. When the wave front is at right angles to the boom, boom length divided by signal propagation velocity should roughly equal the maximum system offset time.

Figure 9:
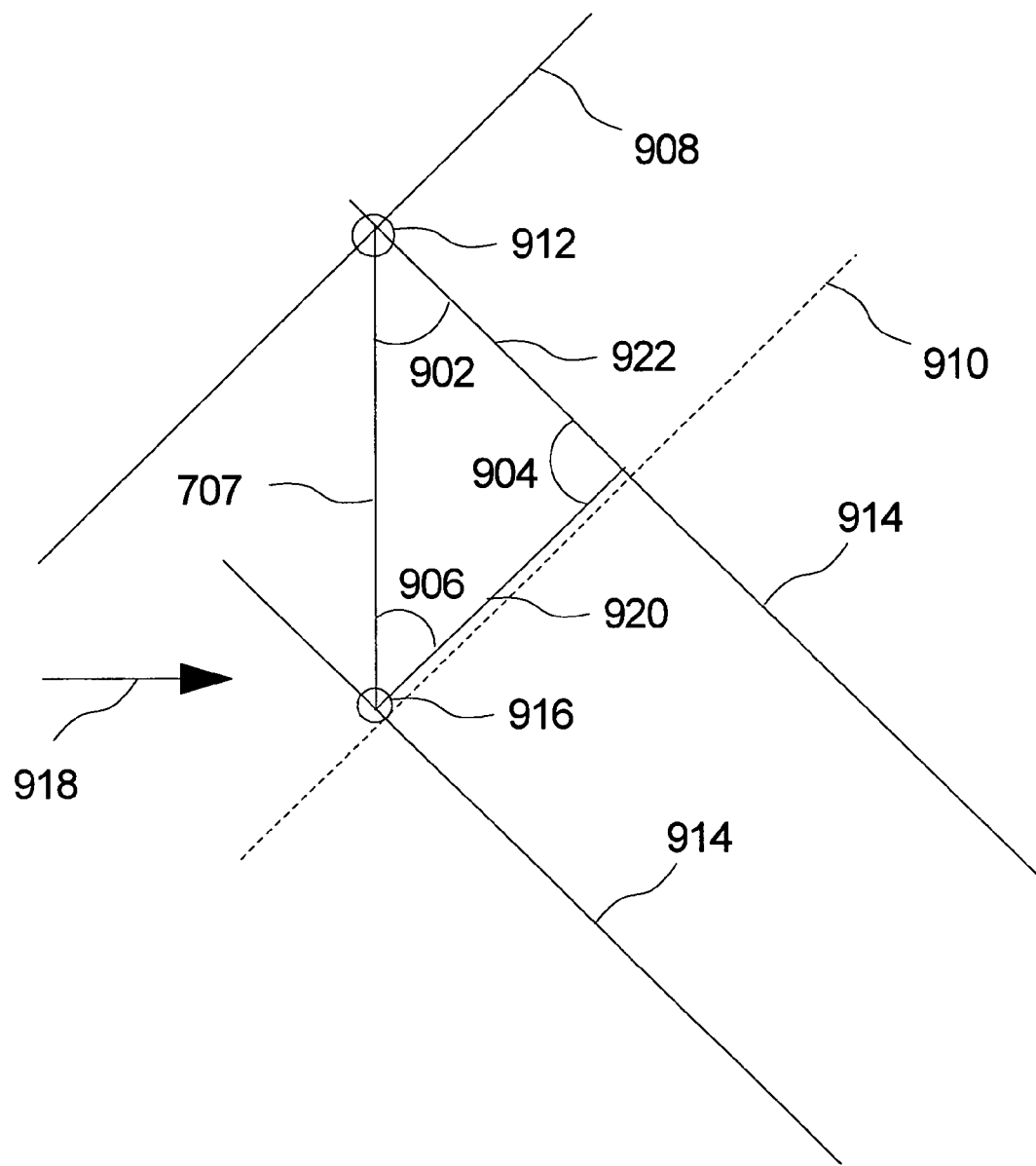
FIG. 9 is a diagram showing the relationship of time of arrival to angle of arrival of a signal wave front.

FIG. 9 shows the time of arrival to angle of arrival relationship. Three angles are shown in FIG. 9: Angle of arrival 902, angle of normal vector to wave front propagation direction vector 904 and angle of antenna boom 707 to normal vector 906. The antenna boom 707 has a north antenna center point 912 and a south antenna center point 916. The responding emergency vehicle is traveling with a direction vector 918. The wave front at time $t_1$ 910 and at time $t_2$ 908 is shown. The wave front propagation direction vectors 914 are also shown. The elapsed time from the reception of wave front at south antenna center point 916 to the reception at the north antenna center point 912 is used to calculate angle of arrival 902. Multiplying the time between reception of wave front 910 and reception of wave front 908 it is possible to calculate the length of side 922 which represents the extra measured distance the wavefront must travel to reach the second antenna to be at the same value point as measured by the first antenna. By applying trigonometric functions to the known values length of antenna boom 707, the angle of normal vector 920, and the length of side 922, it is possible to compute the value of the angle of arrival 902. The angle of arrival 902 indicates the direction that the radio frequency waves are emanating from.

An alternative method is mounting the boom on a calibrated servo 750 and rotating the boom to null the signal as shown in FIG. 8. Note that a handheld receiver with boom would not require a servo as the person holding the system could move the boom while walking and thus keep the boom aimed at the null until arriving at the mobile unit 120 location. The time of arrival technique means an omni directional antenna can be used on the boom. Directional antennas can also be used on the boom. The advantage of using directional antennas is that once the vehicle is headed directly onto the location the null V as shown in FIG. 8 will be easier to use.

The mobile location receiver 702 will need readout display to update the users in making progress. In FIG. 7, the CELS mobile location receiver 702 shows a display 710 with minimal information. Minimal information is the bearing and range to the mobile unit 120. More information can be added such as street address or if the mobile unit 120 is mobile the Highway identification and heading. This information could come from the PSAP operator over the Public Safety Land Mobile Network 260.

In the display 710 is shown two readouts, Fixed and Mobile. In practice only one would be active at a time. The field denotes whether the target mobile unit 120 is moving or fixed. If it is fixed and can be tied to an address, the address is given. If it cannot be tied to an address, the closest tangent point to a highway is given. It may be given as latitude/longitude or distance to the nearest intersection. If the target cellular telephone were in an open space such as an over grown vacant lot or open space but difficult to see and navigate, the first responders would switch to the handheld location receiver and continue the final location. The same is true if the first responder came to a high rise building. In the case of a high rise, the map would show the high rise within the CEP so there would be advanced knowledge that a handheld location receiver is required.

Figure 10:
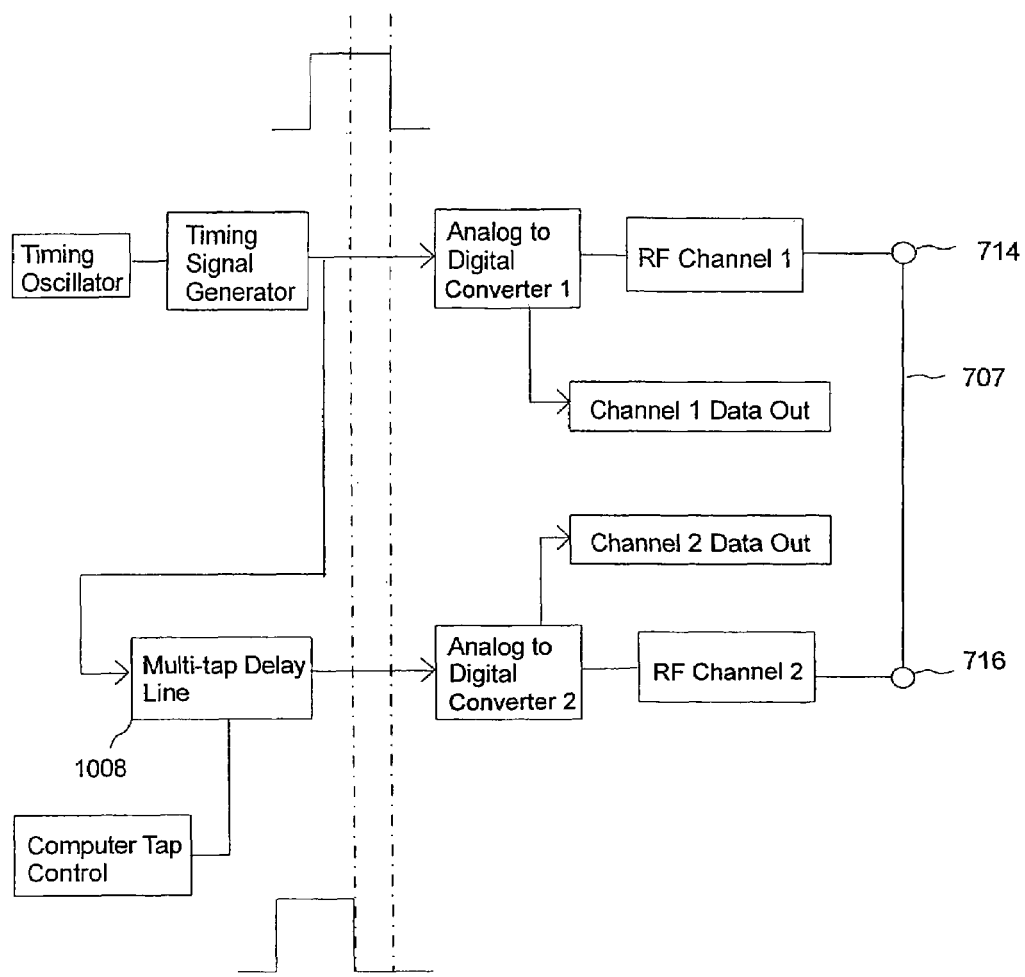
FIG. 10 showing an antenna and associated electronics.

FIG. 10 is a schematic showing logic for performing angle of arrival computations for wave fronts impinging antenna 706. Timing signal is delayed some number of nanoseconds behind the first signal. Integrated circuits in multi-tap delay line 1008 provide delay taps for a range of values, such as for example 0.3 nanoseconds to 30 nanoseconds. Such delay taps are commercially available, such as DS1110 from Dallas Semiconductor. When channel 2 is delayed to channel 1, the boom 707 looks port side. When channel 1 is delayed to channel 2, the boom 707 looks at the starboard side.

For determining the second location calculation of mobile unit 120 from the second location measurement, the current location position of mobile location component 256 should be determined. For example, to determine the current location position of mobile location component 256, beacon transmitter 704 sends the unique beacon transmit signal to half wave whip transmit antenna 720 for reception by communication tower 202, and eventually for processing by tower location receiver 252. Using signal-processing techniques known in the art, the map space location of mobile location component 256 can be derived from the beacon signal by GIS 254 using communication tower location database 506. The second location calculation of mobile unit 120 then can be calculated in combination with the second location measurements.

Display 710 of mobile location component 256 updates progress made by the emergency attendant in locating mobile unit 120. Information displayed includes bearing and range measurements of mobile unit 120. More information can be added such as street address or if mobile unit 120 is moving, the highway identification and heading. The situation awareness map illustrated as GUI 600 in FIG. 6 may also be displayed on display 710, for example. This additional information may come from PSAP GIS network 258 over public safety land mobile network 260.

Figure 11:
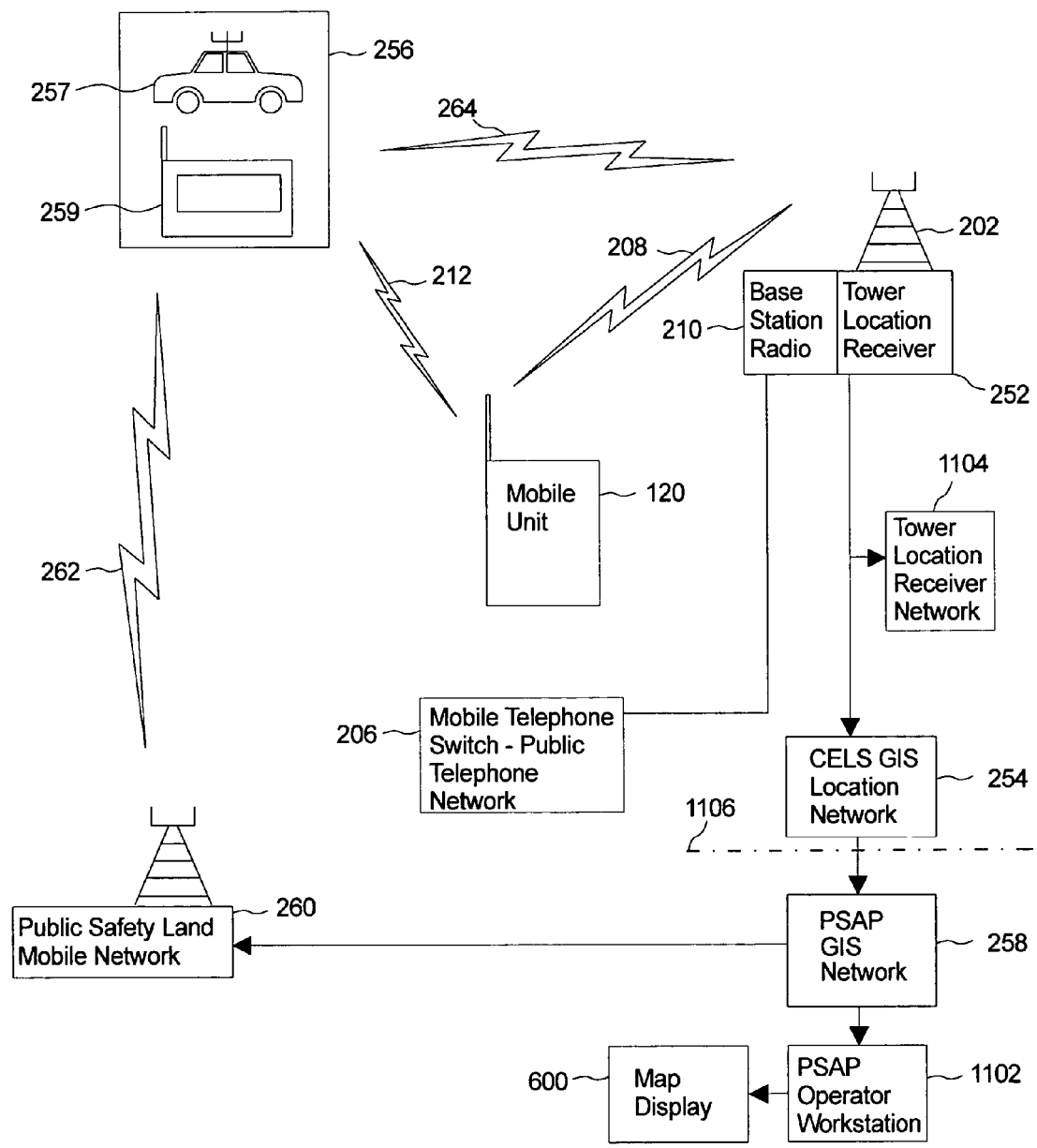
FIG. 11 illustrates message flow in a cooperative element location system.

FIG. 11 illustrates message flow in an exemplary embodiment of the present invention. Tower location receiver 252 transmits to the GIS 254 messages of the following types: tower e911 cellular telephone coarse position data; request for chirp data; RF signal parameter message including unique cellular telephone electronic identification number/electronic serial number (EID/ESN), control channel, and channel assignment for PSAP GIS network 258; and tower e911 refined position data using chirp results. GIS 254 transmits to PSAP GIS network 258 messages of the following types: e911 cellular telephone position location data; tracking beacon location data; and e911 RF signal parameters including unique cellular telephone EID/ESN, control channel and channel assignment for mobile unit 256. PSAP GIS network 258 transmits to mobile unit 256, via public safety land mobile network 260, messages of the following types: mobile cellular telephone initial position location text and graphic message for display; and RF signal parameter exchange message including unique cellular telephone EID/ESN, control channel, and control channel assignment for location receiver. GIS 254 and PSAP GIS network 258 are interconnected at the network demarcation 1106.

Figure 12:
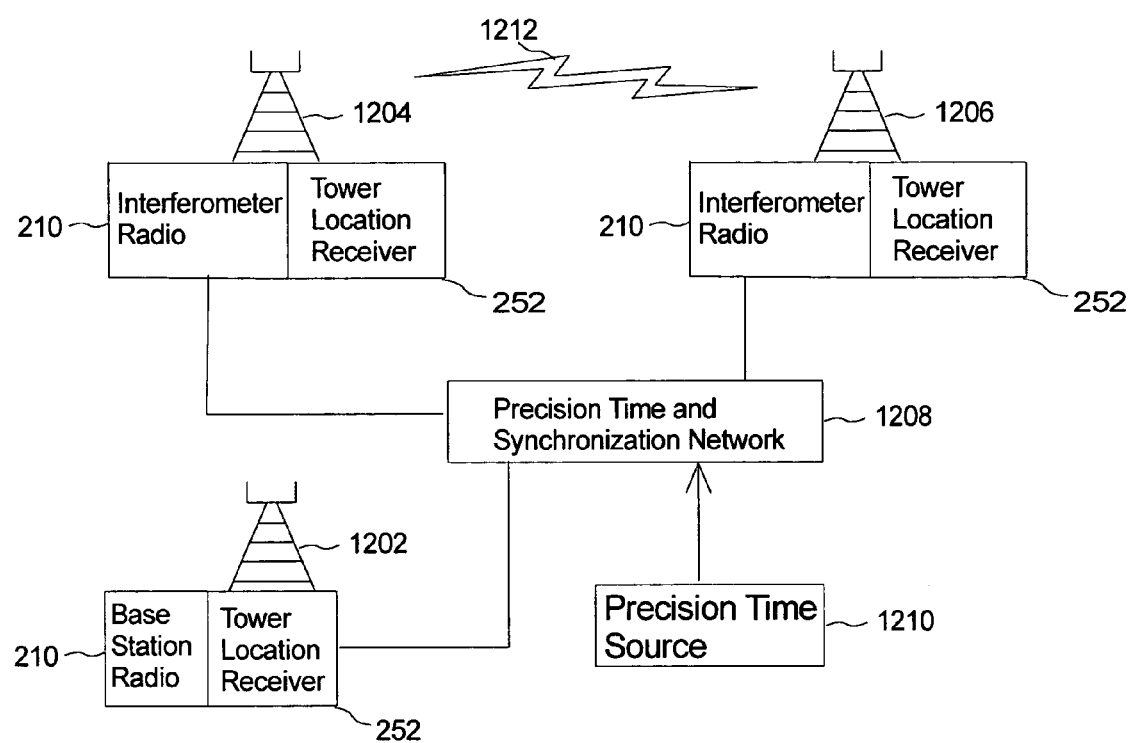
FIG. 12 is a diagram of an interferometer link between representative cells.

FIG. 12 illustrates the optional addition of an interferometer link between cells of a cellular telephone network. This may be useful in the context of the current invention to further enhance precision, but is not strictly necessary.

An interferometer link can be formed between any two cell points that can see each other. It is used to establish a means to compute accurately propagation velocity, propagation time, and distance between points in real time. A calibrated link will detect the type and variance of transmission losses associated with atmospheric conditions.

In FIG. 12, cell towers 1202, 1204, and 1206 are linked by a precision time and synchronization network 1208 which is linked to a precise time source 1210 and distributes data to all cells in a region. Precise time and time interval calibrated transmission bursts 1212 are communicated between cell towers 1204 and 1206, for example.

The interferometer function provides information about propagation loss factors so an accurate estimate of basic transmission loss can be used to compare with an unknown received signal level. Tower location receiver 252 may use this comparison to more accurately compute range and bearing of mobile unit 120.

Figure 14:
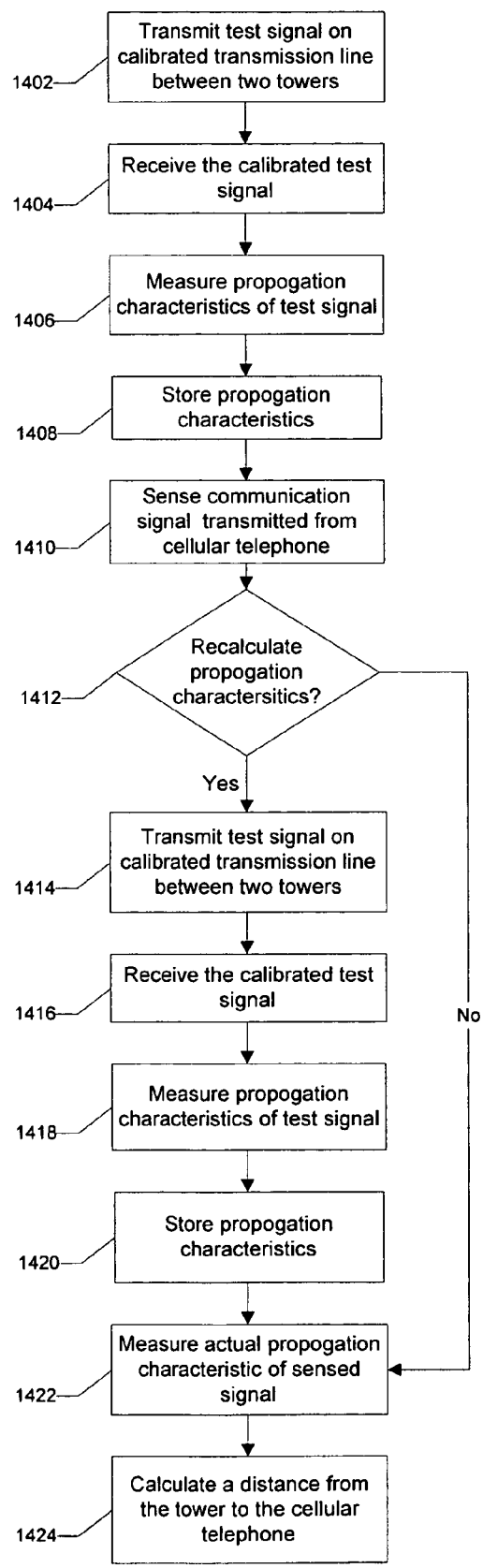
FIG. 14 is a flowchart describing the process of using towers with an interferometer link to locate a cellular telephone.

FIG. 14 shows a flowchart that describes the process of using the optional interferometer link to calculate distance from a tower to a cellular telephone. In step 1402, a test signal is transmitted from a first tower on a calibrated line. In step 1404, a second tower receives the calibrated test signal. In step 1406, the second tower measures the propagation characteristic of the test signal. In step 1408, the propagation characteristic is stored for future use. In step 1410, a communications signal is sensed from a cellular telephone. In step 1412, the system determines whether a recalculation of the propagation characteristic is needed. If a recalculation is needed, steps 1414–1420 are performed. These steps are the same as steps 1402–1408 described above. Otherwise, step 1422 is performed. In step 1422, the propagation characteristic of the sensed signal is measured. In step 1424, the calculated propagation characteristic is compared against the measured propagation characteristic to determine a distance to the cellular telephone.

FIG. 12 shows the addition of an interferometer capability to an existing cellular system. Note that it is not necessary to add interferometer capability to all cell sites. The network that carries the precision time and sync data can also carry the interferometer data to all cells within a geographical location. For example a geographic region as large as 500 miles could be served from one representative interferometer link. The interferometer provides useful information in the form of corrections for the path predication calculations. It is a fact that propagation loss does not exactly match the $1/r^2$ loss model. It is in fact somewhere between $1/r^2$ and $1/r^3$. What the interferometer does is allow the link equipment to measure the loss at the time and compute an accurate $1/r^x$ where $2 \leq x \leq 3$. The other way to compute propagation loss in excess of the $1/r^2$ model is use information from publications like NBS Technote 101 that contain tables of climate loss values and pull those values that match the current climatic situation and enter them into the prediction model. The prediction model is used to compute the estimated range and in turn location of the mobile unit 120.

Figure 13:
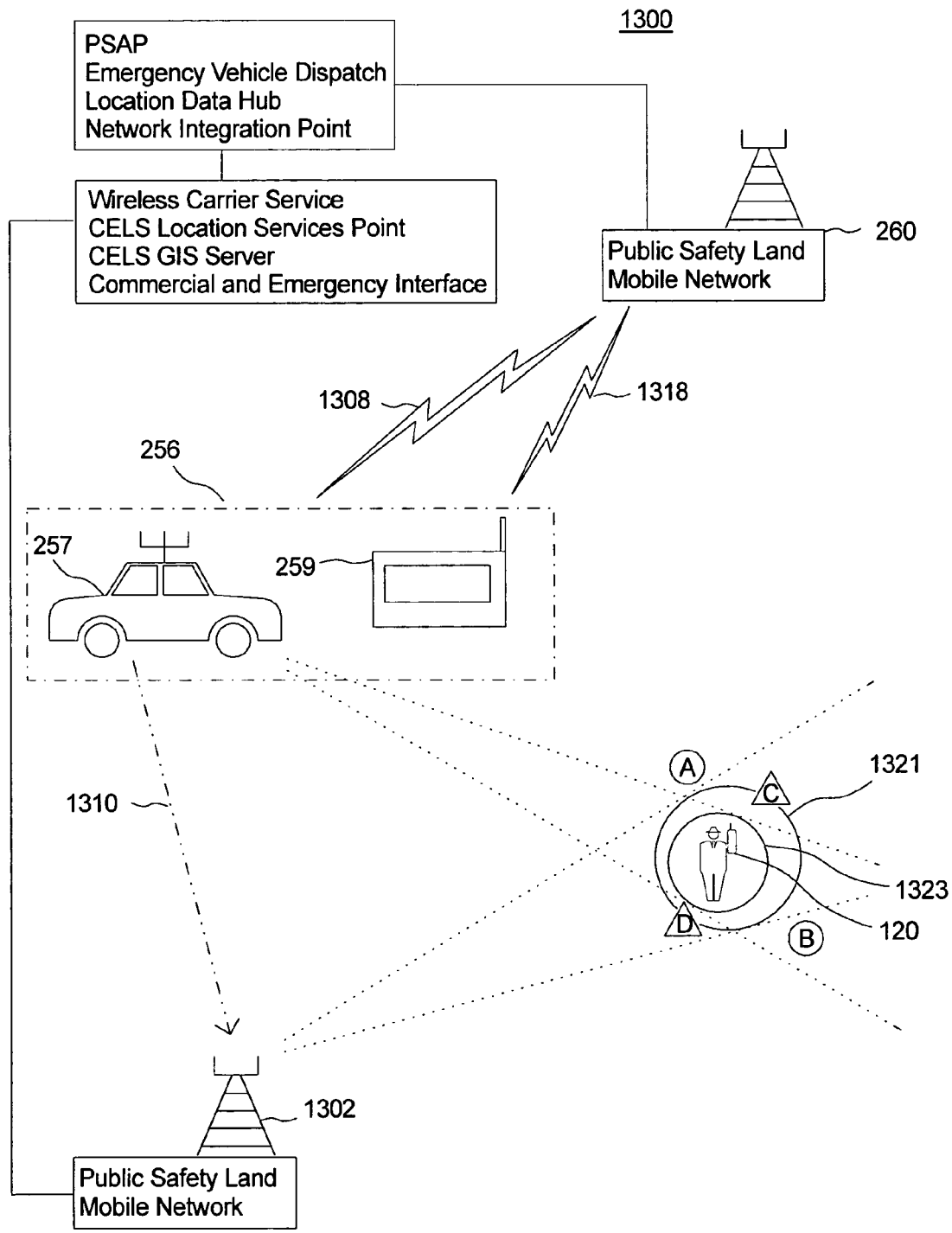
FIG. 13 is a representative diagram showing a series of Circular Error of Probability estimations of decreasing size.

FIG. 13 shows the operation of a cooperative element location system 1300 designed to locate a mobile unit 120. A coarse CEP 1321 provides the initial dispatch point defined by two point circle A, B. Targeted mobile unit 120 is located somewhere within coarse CEP 1321. Determination of this coarse CEP requires only one cell tower 1302, for example. Mobile location component 256 may include vehicle mount 257 and/or hand-held device 259. A location beacon 1310 is transmitted from emergency vehicle 1304 to cell tower 1302.

Emergency vehicle 1304 receives transmission 1308 including information identifying coarse CEP 1321. In response, emergency vehicle travels in the direction of CEP 1321. As emergency vehicle 1304 travels closer to target mobile unit 120 located in coarse CEP 1321, cooperative element location system 1300 is able to provide a fine location solution of a smaller circle bounded by points C and D. The smaller circle represents fine CEP 1323 which is a two point circle contained within coarse CEP 1321. Target mobile unit 120 is now known to be located in fine CEP 1323. This process may be reiterated until target mobile unit 120 is located.

If necessary, handheld location receiver 259 may be used to go places where emergency vehicle 1304 cannot travel, such as inside a building. In that case, handheld location receiver 259 receives transmission 1318 containing increasingly accurate information regarding the location of target mobile unit 120.

What is claimed is:

1. A wireless radio communications system that includes at least one communications tower and a mobile unit, the system comprising:

a mobile unit configured to emit signals representing a plurality of three-digit codes, a first one of the plurality indicating a request for emergency services and a second one of the plurality indicating a request for location-based non-emergency commercial services;

a communications tower receiver associated with a communications tower, the communications tower receiver configured to receive the signals and decode the plurality of three-digit codes, including both the first one indicating a request for emergency services and the second one indicating a request for location-based non-emergency commercial services, the communications tower receiver further configured to perform a location measurement responsive to receipt of any one of the first and second codes, the location measurement including issuing a wireless chirp-on-demand command to the mobile unit, the wireless chirp-on-demand command instructing the mobile unit to transmit a chirp signal;

a location receiver operatively connected to the at least one communication tower configured to receive the chirp signal from the mobile unit and determine a location calculation of the mobile unit, the system taking different action with said determined location calculation depending on which one of the first and second codes was transmitted from the mobile unit.

2. A wireless radio communications system that includes at least one communications tower and a mobile unit, the system comprising:

a mobile unit configured to emit signals representing a plurality of codes, a first one of the plurality indicating a request for emergency services and a second one of the plurality indicating a request for location-based non-emergency commercial services;

a communications tower receiver associated with a communications tower, the communications tower receiver configured to receive the signals and decode the plurality of codes, including both the first one indicating a request for emergency services and the second one indicating a request for location-based non-emergency commercial services, the communications tower receiver further configured to perform a location measurement responsive to receipt of one of the first and second codes, the location measurement including issuing a wireless chirp-on-demand command to the mobile unit, the wireless chirp-on-demand command instructing the mobile unit to transmit a chirp signal comprising a pattern of frequency, amplitude, and timing;

a location receiver operatively connected to the at least one communication tower configured to receive the chirp signal from the mobile unit and decode the signal according to its pattern of frequency, amplitude, and timing for determining a location calculation of the mobile unit.

3. A method comprising the steps of:

receiving at a single communications tower a wireless signal from a cellular telephone, the signal representing a dialed three-digit code;

decoding at the communications tower the three-digit code;

determining at the single communications tower that the decoded three-digit code represents a request for location-based non-emergency services;

in response to said receiving, sending to the cellular telephone a chirp-on-demand signal causing the cellular telephone to emit a chirp signal;

receiving the emitted chirp signal at the single communications tower from the cellular telephone;

performing an approximate location calculation based solely on signals received wirelessly at the single communications tower; and wirelessly providing location-based non-emergency information services to the cellular telephone based on the approximate location calculation.

* * * * *